(12) United States Patent
Kamiya et al.

(10) Patent No.: US 6,296,303 B1
(45) Date of Patent: Oct. 2, 2001

(54) VEHICLE COCKPIT MODULE

(75) Inventors: Tomohiro Kamiya, Takahama; Kazushi Shikata; Shigeo Numazawa, both of Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/712,595

(22) Filed: Nov. 14, 2000

(30) Foreign Application Priority Data

Nov. 24, 1999 (JP) .................................................. 11-333118
Jul. 3, 2000 (JP) .................................................. 12-201494

(51) Int. Cl.[7] .................................................. B62D 25/14
(52) U.S. Cl. .......................... 296/296; 296/72; 296/194; 296/203.02; 296/70
(58) Field of Search ............................. 296/70, 72, 194, 296/203.02

(56) References Cited

U.S. PATENT DOCUMENTS

| | | | |
|---|---|---|---|
| 4,733,739 | * 3/1988 | Lorenz et al. | 296/72 |
| 4,909,566 | * 3/1990 | Hashimoto et al. | 296/70 |
| 4,962,961 | * 10/1990 | Ito et al. | 296/194 |
| 5,082,078 | * 1/1992 | Umeda et al. | 296/70 |
| 5,088,571 | * 2/1992 | Burry et al. | 296/70 |
| 5,234,246 | * 8/1993 | Henigu et al. | 296/70 |
| 5,238,286 | * 8/1993 | Tanaka et al. | 296/70 |
| 5,387,023 | * 2/1995 | Deneau | 296/72 |
| 5,564,515 | * 10/1996 | Schambre | 296/70 |
| 5,676,216 | * 10/1997 | Palma et al. | 296/70 |
| 5,938,266 | * 8/1999 | Dauvergne et al. | 296/70 |
| 5,979,965 | * 4/1999 | Nishijima et al. | 296/70 |
| 5,992,925 | * 11/1999 | Alberici | 296/203.02 |
| 5,997,078 | * 12/1999 | Beck et al. | 296/70 |
| 6,073,987 | * 6/2000 | Lindberg et al. | 296/70 |
| 6,095,272 | * 8/2000 | Takiguchi et al. | 296/70 |
| 6,129,406 | * 10/2000 | Dauvergne | 296/70 |
| 6,176,544 | * 1/2001 | Seksaria et al. | 296/203.02 |

* cited by examiner

*Primary Examiner*—Joseph D. Pape
*Assistant Examiner*—Kiran B. Patel
(74) *Attorney, Agent, or Firm*—Harness, Dickey & Pierce, PLC

(57) ABSTRACT

The present invention integrates a blower unit into a vehicle dashboard and of reducing blower-vibration transmittance to a steering unit. In a vehicle, at least a reinforcement member having a steering support portion and an air conditioner are disposed inside a dashboard, at least a portion of a blower unit of the air conditioner is fixed to a side bracket for fixing the reinforcement member to a vehicle body. Further, the blower unit is integrally mounted inside the dashboard via the reinforcemnt member. This manner can attain both of realizing the modulization that the blower unit is integrated into the vehicle dashboard and of reducing the vibration transmittance from the blower unit to the steering support portion via the reinforcement member.

8 Claims, 9 Drawing Sheets

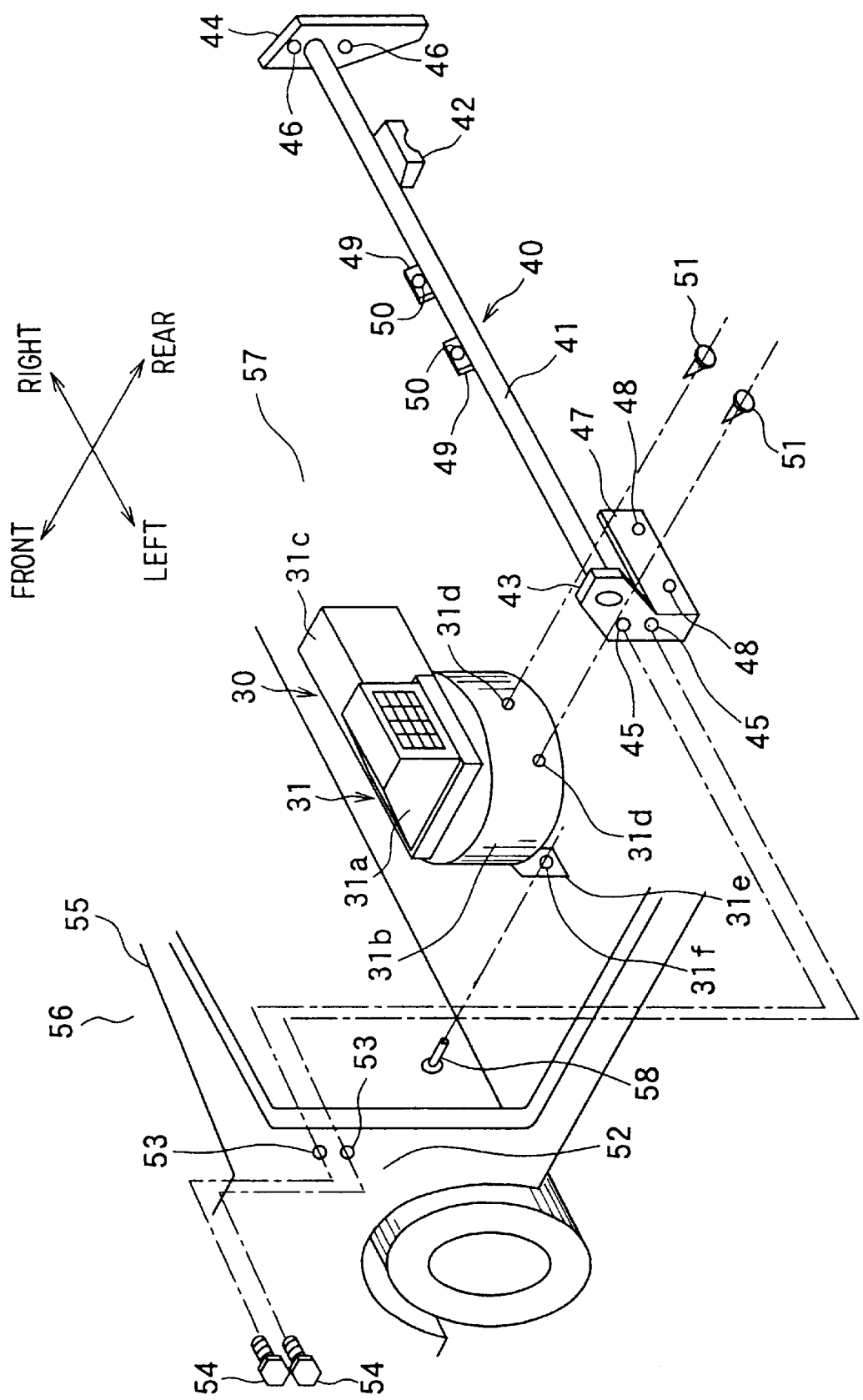

VEHICLE COCKPIT MODULE

CROSS-REFERENCE TO RELATED APPLICATION

The present invention is related to Japanese patent application No. Hei. 11-333118, filed Nov. 24, 1999; 2000-201494, filed Jul. 3, 2000, the contents of which are incorporated herein by reference.

FIELD OF THE INVENTION

The present invention relates to a vehicle cockpit module, and more particularly, to a vehicle cockpit module having equipment such as an air conditioner integrally mounted inside a vehicle dashboard.

BACKGROUND OF THE INVENTION

In a conventional vehicle air conditioner, when a blower unit and an air conditioner are disposed in a vehicle dashboard, they are generally fixed by screws to a partition wall (fire wall) between a passenger compartment and an engine room, requiring them to be affixed separately from the dashboard. On the other hand, modulization simplifies the vehicle assembly process by integrating the dashboard and peripheral equipment beforehand as a cockpit module, and affixing the module to the vehicle body at the same time. However, the above-described prior art cannot cope with this modulization.

To solve this problem, the blower unit and air conditioner are integrated inside the dashboard via the rod shape reinforcement member by fixing the blower unit and air conditioner to the rod shape reinforcemnt member. However, a steering unit is supported on the above-described rod shape reinforcement member via a steering stay. Therefore, if the blower unit portion is fixed directly to the rod shape reinforcement member, vibrations due to the operation of the blower unit are transmitted to the steering unit via the rod shape reinforcement member.

SUMMARY OF THE INVENTION

The present invention integrates the blower unit into the dashboard and reduces the vibration transmitted to the steering unit. A cockpit module for a vehicle having a dashboard has the following elements. A dashboard contains at least an air conditioner and a reinforcement member including a support portion for supporting a steering unit. In the cockpit module, at least a portion of a blower unit of the air conditioner is fixed to a fixing portion for fixing the reinforcement member to a vehicle body. The blower unit is integrally mounted inside the dashboard via the reinforcemnt member.

In another aspect, the dashboard contains at least an air conditioner and a reinforcement member including a support portion for supporting a steering unit. In the cockpit module, at least a portion of a blower unit of the air conditioner is fixed to the reinforcement member. A portion is disposed within a vibration transmittance route in the reinforcemnt member between a second portion and the support portion. Here, the portion fixes the reinforcement member to a vehicle body, and the second portion is fixed to the blower unit. In the cockpit module, further, the blower unit is integrally mounted inside the dashboard via the reinforcement member.

In another aspect, the portion is disposed within a vibration transmittance route in the reinforcement member between the second portion and the support portion. Therefore, vibration transmission is stopped at the portion, from the blower unit to the support portion via the reinforcement member.

In another aspect, the dashboard contains at least an air conditioner and a reinforcement member including a support portion for supporting a steering unit. In the cockpit module, the reinforcement member is disposed inside the dashboard to extend in a vehicle lateral direction, and fixing portions are respectively disposed at each end of the reinforcement member in the vehicle lateral direction. Here, each of the fixing portions is fixed to the vehicle body. In the cockpit module, further, the support portion is disposed around one end of the reinforcement member in the vehicle lateral direction. At least a portion of the blower unit is fixed to the other end of the reinforcement member in the vehicle lateral direction, and an air conditioner unit is fixed to the reinforcement member between the support portion and the blower unit. Here, the air conditioner unit adjusts the temperature of air blown from the blower unit and blows the adjusted air into a passenger compartment. In the cockpit module, furthermore, the blower unit and the air conditioner unit are integrally mounted inside the dashboard via the reinforcement member.

In another aspect, the reinforcement member includes a bracket provided separately from itself for fixing the reinforcement member to the vehicle body, and the fixing portion fixed to the blower unit is disposed on the bracket. In another aspect, the dashboard contains at least an air conditioner and a reinforcement member including a support portion for supporting a steering unit. In the cockpit module, the reinforcement member is disposed inside the dashboard to extend in a vehicle lateral direction. Fixing portions are respectively disposed at each end of the reinforcemnt member in the vehicle lateral direction. A blower unit of the air conditioner is disposed around one end of the reinforcement member in the vehicle lateral direction, and a stiff component is disposed adjacent to the blower unit. Here, the component performs another operation different from air-blowing operation. In the cockpit module, further, the blower unit is fixed to one end of the reinforcement member in the vehicle lateral direction via the component, and the blower unit is integrally mounted inside the dashboard via the component and the reinforcement member. Moreover, the blower unit is fixed to one end of the reinforcement member in the vehicle lateral direction via the component.

In another aspect of the invention, a bracket is provided at one end of the reinforcement member in the vehicle lateral direction, and fixing portions are disposed on the bracket. Here, a first fixing portion is fixed to the vehicle body, a second stiff fixing portion is fixed to the component. A third fixing portion is fixed to the dashboard. In the cockpit module, further, the first fixing portion is disposed on the bracket between the second fixing portion and the third fixing portion. Further, the numeral numbers respectively labeled in parentheses for each above-described unit respectively correspond to each specific unit in below-described embodiments.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 8 is an exploded perspective view showing a third embodiment of a vehicle cockpit module according to the present invention;

DETAILED DESCRIPTION OF THE INVENTION

Figure 1:
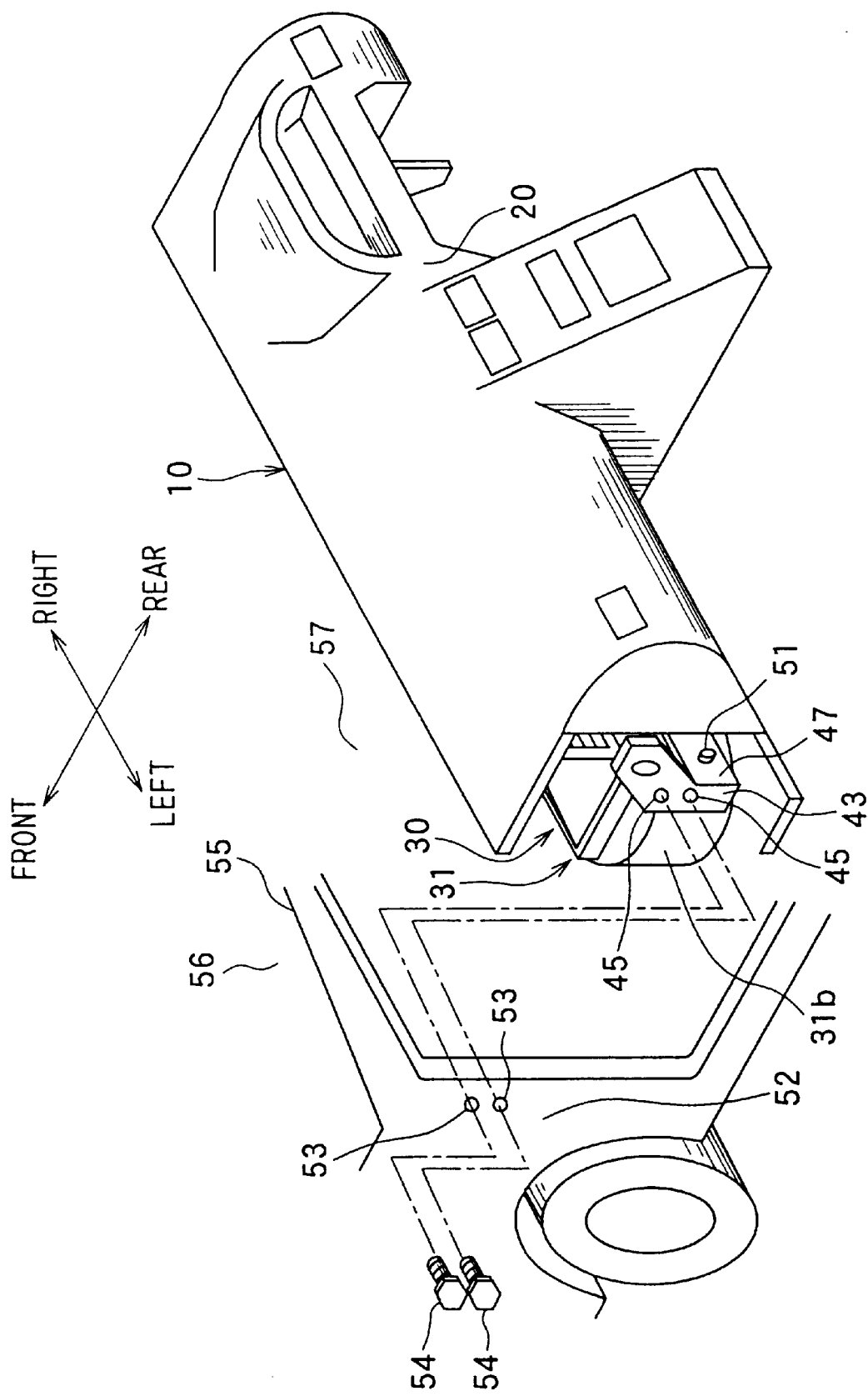
FIG. 1 is a perspective view showing a first embodiment of a vehicle cockpit module according to the present invention.
Figure 2:
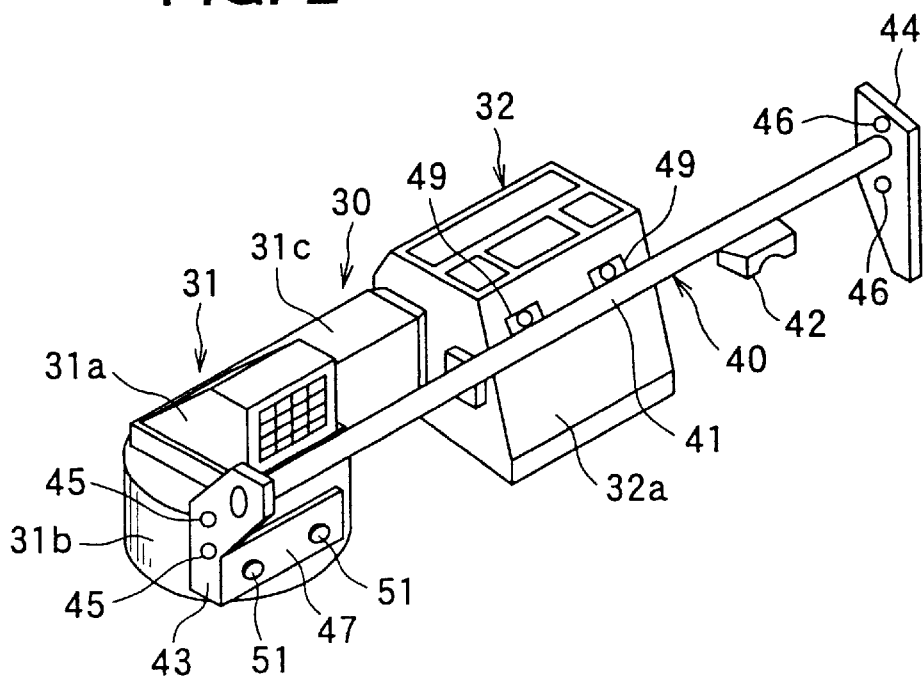
FIG. 2 is a perspective view of a vehicle cockpit module according to the present invention.
Figure 3:
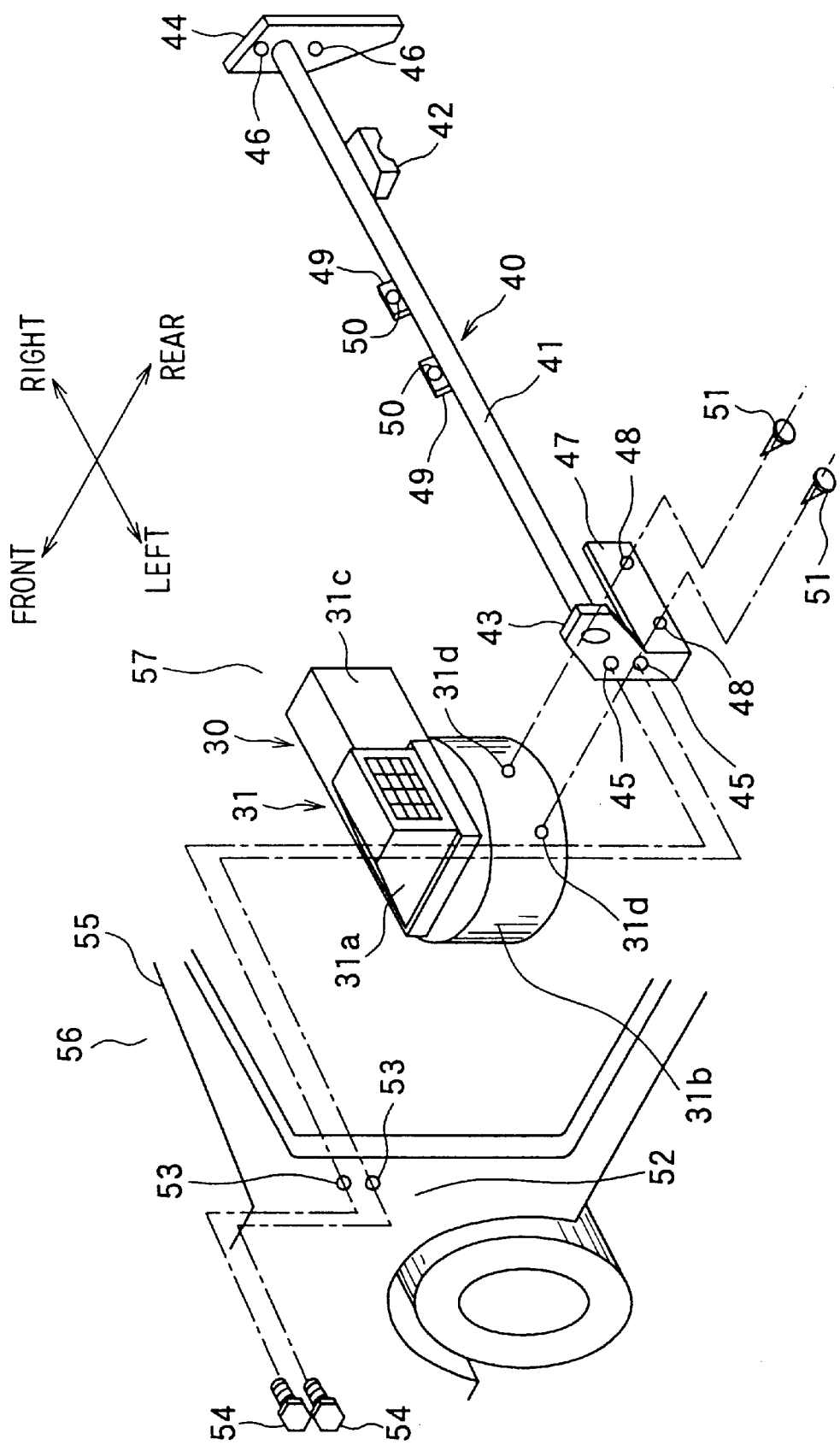
FIG. 3 is an exploded perspective view of a vehicle cockpit module according to the present invention.
Figure 4:
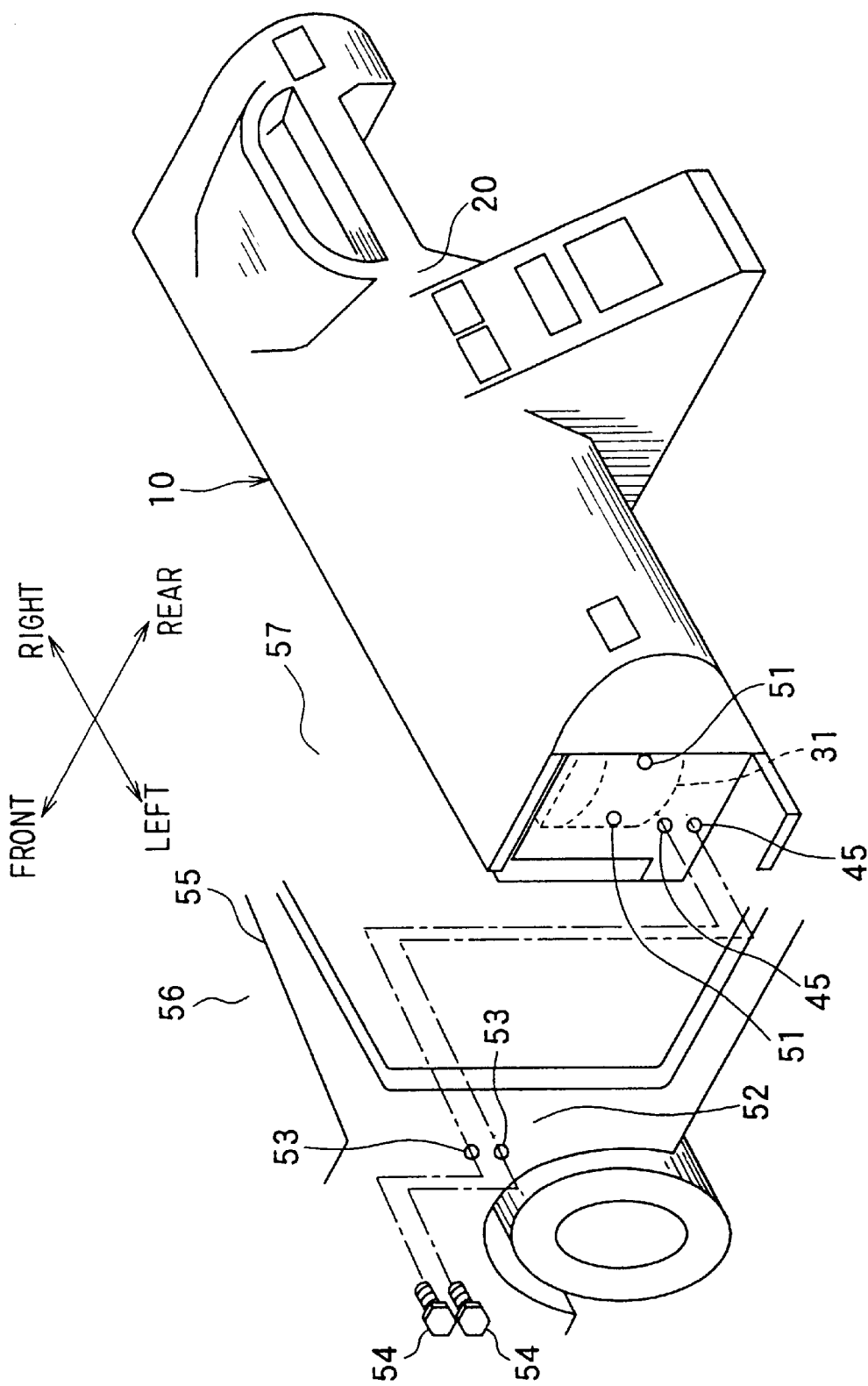
FIG. 4 is a perspective view of a second embodiment of a vehicle cockpit module according to the present invention.
Figure 6:
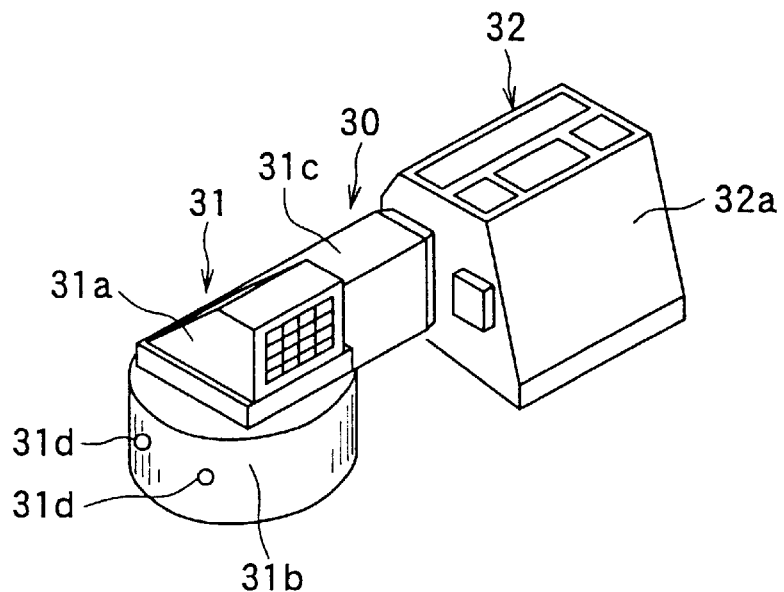
FIG. 6 is a perspective view showing an air conditioner unit used in conjunction with a vehicle cockpit module according to the present invention.

FIGS. 1–3 show an assembled vehicle cockpit module 10 according to a first embodiment of the present invention. The cockpit module 10 mounts various equipment inside a vehicle dashboard 20, such as a vehicle air conditioner 30. FIG. 2 shows a blower unit 31 and an air conditioner unit 32 of the vehicle air conditioner 30 contained inside the vehicle dashboard 20. FIG. 3 is an exploded perspective view showing components inside the vehicle dashboard 20. Arrows shown in FIGS. 1, 3 respectively show each of a longitudinal direction and a lateral direction of the vehicle installed with the vehicle cockpit module 10.

Since the vehicle cockpit module 10 according to the first embodiment is illustrated in a right-hand drive vehicle, the blower unit 31 is disposed on a passenger seat side in a vehicle left side, and the air conditioner unit 32 is disposed proximate the center in the vehicle lateral direction. Since the blower unit 31 and the air conditioner unit 32 are well known, both will be briefly explained. The blower unit 31 has an inside/outside air switching box 31a, wherein inside/outside air is switched to be introduced, in the upper portion thereof. In the lower portion thereof, the blower unit 31 has a centrifugal type blower 31b for blowing air introduced from the inside/outside air switching box 31a. Further, the blower unit 31 has an air blowing duct portion 31c. The blower 31b is composed of a centrifugal type fan and a fan driving motor. An air conditioner unit 32, for adjusting the temperature of air blown from the blower unit 31 and blowing the adjusted air into the passenger compartment, has a resin case 32a connected to the above-described air blowing duct portion 31c. The resin case 32a contains an evaporator as a cooling heat exchanger for cooling blown air, a hot water type heater core as a heating heat exchanger for heating blown air, an air mixing damper as a temperature controlling means, an air blowing mode switching damper having an air blowing mode switching mechanism, and the like.

A reinforcement member 40, extending in the vehicle lateral direction, is disposed inside the dashboard 20. A main body portion 41 of the reinforcement member 40 has a rod shape. The cross-sectional shape of the main body 41 is not limited to a circular shape, but may be a rectangular shape. The rod shape main body portion 41 is formed of a metal (such as an iron group metal).

The reinforcement member 40, mainly for supporting a steering unit, is illustrated in the right-hand drive vehicle in the present example. A support stay 42 (support portion) for the steering unit is fixed by welding (or other methods) to the rod shape main body portion 41 at a position proximate the tight end portion. The stay 42, for supporting a housing portion (not shown in the drawing) of the steering unit, is formed of a metal (such as iron).

Side brackets 43, 44 are respectively fixed by welding, or other methods, to the rod shape main body portion 41 of the reinforcemnt member 40 at both end portions in the vehicle lateral direction. The side brackets 43, 44 are formed of metal (such as iron) and have a plate shape. Side brackets 43, 44 are disposed perpendicular to an axial direction of the reinforcement member 40 (vehicle lateral direction).

The side bracket 43 has two mounting holes 45 by which the vehicle body-side portion 15 is affixed thereto, and the side bracket 44 has also two mounting holes 46 used for the same reasons as holes 45. Further, nuts are respectively fixed to each back portion of the mounting holes 45, 46. Since the blower unit 31 is disposed on the passenger seat side in the vehicle left side, a subsidiary bracket portion 47, to which the blower unit 31 is fixed, is integrally formed on the side bracket 43 on the left side.

That is, in the side bracket 43 on the left side, the subsidiary bracket 47 is integrally bent to extend further from lower side portion than a position fixed to the rod shape main body portion 41 in a vehicle inside direction (lateral direction). The subsidiary bracket 47 has also two mounting holes 48 by which the blower unit 31 is fixed thereto.

Two center brackets 49 formed of metal (such as iron), for fixing the air conditioner unit 32 to the reinforcement member 40, are fixed by welding (or other methods) to the rod shape main body portion 41 of the reinforcement member 40. Brackets 49 are attached at the center portion in the vehicle lateral direction. The two center brackets 49 each have a mounting hole 50. In FIG. 1, a partition wall (fire wall) 55 of the vehicle body partitions a passenger compartment 57 on the vehicle rear side from a vehicle engine room 56 on the vehicle front side.

Next, a process of installing the cockpit module 10 in the vehicle will be explained. At first, the blower unit 31 and the air conditioner unit 32 are fixed to the reinforcement member 40. Specifically, as shown in FIG. 3, the blower unit 31 is fixed to the reinforcement member 40 by screwing two blower-fixing screws (fixing means) 51 into hole portions 31d of the resin case (scroll case) of the blower 31b of the blower unit 31 via the mounting holes 48 of the subsidiary bracket portion 47. Similarly, the air conditioner unit 32 is also fixed to the reinforcement member 40 by screws (fixing means, not shown in the drawing) inserted into the mounting holes 50 of the center brackets 49. FIG. 2 shows the blower unit 31 and the air conditioner unit 32 after respectively fixed to the reinforcement member 40.

Next, the reinforcement member 40, with the blower unit 31 and the air conditioner unit 32 integrated, and other equipment are positioned inside the dashboard 20. Then, these elements are integrally mounted on the dashboard 20, thereby being modulized. FIG. 1 shows the cockpit module 10 after assembled for modulization. The reinforcement member 40 can be integrated into the dashboard 20 by various means. For example, mounting portions fixed to the dashboard 20 are provided on the side brackets 43, 44, and the reinforcement member 40 is fixed to the dashboard 20 by the mounting portions. Also, the vehicle steering unit can be integrated as a portion of the cockpit module 10 by supporting a housing portion (not shown in the drawing) of the vehicle steering unit and fixing that to the steering unit supporting stay 42.

Next, the cockpit module 10 is installed in the vehicle. That is, the reinforcement member 40 is positioned to align mounting holes 45, 46 of the side brackets 43, 44 to mounting holes 53 respectively provided on the right and left vehicle body side portions 52. Then, the side brackets 43, 44 are fixed to the vehicle body side portions 52 by screwing reinforcemnt-member fixing bolts (fixing means) 54 into the nuts on the back portion of the mounting holes 45, 46 of the side brackets 43, 44. The dashboard 20 is also fixed to the vehicle body side at required positions by screws. According to the above-described process, since the dashboard 20 and the peripheral equipment (such as the blower unit 31 and the air conditioner unit 32) are beforehand integrated as a cockpit module 10, the dashboard 20 and the peripheral equipment can be easily installed in the vehicle.

The subsidiary bracket portion 47 is provided on the side bracket 43 fixed to the vehicle body, thereby effectively reducing vibration transmitted to the steering unit due to blower unit 31. Specifically, the vibrations generated due to blower unit 31 are transmitted to the steering unit via the following vibration transmittance route: the subsidiary bracket portion 47→the side bracket 43→the rod shape main body portion 41→the stay 42. At this time, since the side bracket 43 is firmly fixed to the vehicle body, the vibration transmittance is interrupted at the fixed portion on the vehicle body side, thereby effectively reducing the vibrations transmitted to the steering unit.

In the above-described first embodiment, it has been explained that the vehicle steering unit is also integrated into the cockpit module 10 as a portion of the cockpit module 10 before the cockpit module 10 is installed in the vehicle. However, after the cockpit module 10 is installed in the vehicle, the housing portion (not shown in the drawing) of the vehicle steering unit may be supported by the fixing stay 42 and fixed thereto.

Figure 7:
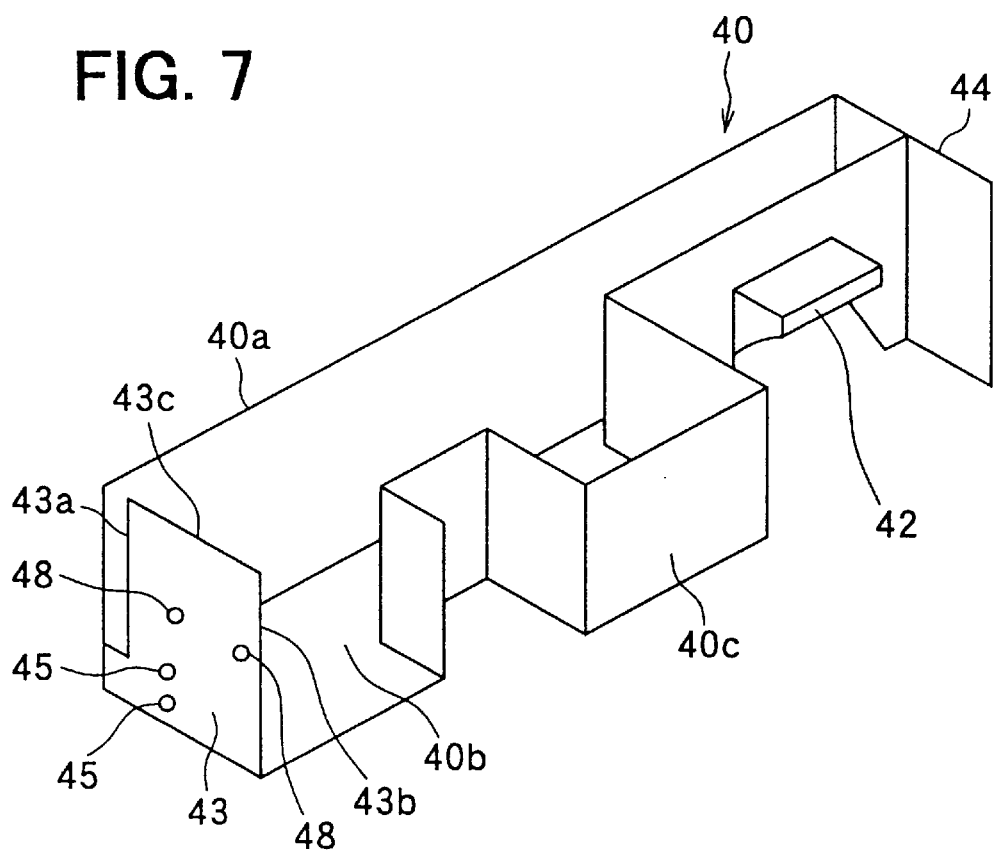
FIG. 7 is a perspective view showing a plate shape reinforcemnt member of a vehicle cockpit module according to the present invention.

In a second embodiment of the present invention, as shown in FIGS. 4–7, the reinforcement member 40 is plate shaped and extends in a vehicle lateral direction. As shown in FIG. 7, the reinforcemnt member 40 has a front face plate 40a, a bottom face plate 40b, a rear face plate 40c and side brackets 43, 44. The front face plate 40a and the bottom face plate 40b respectively extend linearly in the vehicle lateral direction, and the rear face plate 40c extends in the vehicle lateral direction in an irregular shape corresponding to the shape of the rear face of the air conditioner 30. The side brackets 43, 44 are plate shaped and are disposed at each end of the reinforcement member 40 in the vehicle lateral direction.

The two mounting holes 45, for affixing side bracket 43 to the vehicle body, are provided on the side bracket 43 on the left lower side. Further, the two mounting holes 48, affixing side bracket 43 to blower unit 31, are provided on the side bracket 43 at an area raised with respect to mounting holes 45. In the side bracket 43, edges 43a, 43b are respectively provided raised from mounting holes 48 and are separated from the other portion of the reinforcement member 40. Further, the stay 42, by which the steering unit is fixed to the reinforcement member 40, is provided on the rear face plate 40c adjacent to the right end of reinforcement member 40. The air conditioner unit 32 can be fixed to the reinforcement member 40 on the front face plate 40a and the rear face plate 40c while the air condition disposed on the bottom face plate 40b, thereby simplifying the fixing operation of the air conditioner unit 32.

Figure 5:
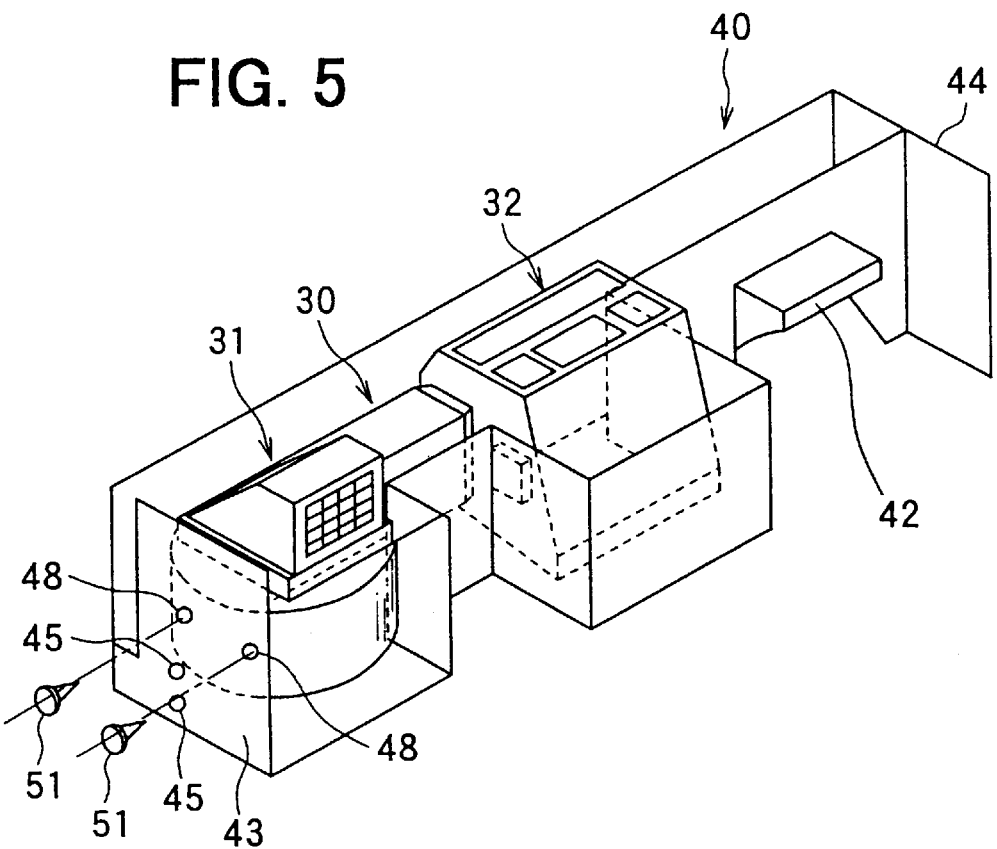
FIG. 5 is a perspective view of a vehicle cockpit module according to the present invention.

On the other hand, the blower unit 31 is fixed to the side bracket 43 only at mounting holes 48. That is, the hole portions 31d are provided on the side of the resin case (scroll case) of the blower 31b. Then, as shown in FIG. 5, the blower unit 31 is mounted on the reinforcement member 40 by screwing the two blower-fixing screws (fixing means) 51 into the hole portions 31d of the blower unit 31 via the mounting holes of the side bracket 43. The blower unit 31 is in contact with only the side bracket 43 of the reinforcement member 40 at the hole portions 31d. It is not in contact with the front face plate 40a, the bottom face plate 40b or the rear face plate 40c of the reinforcement member 40. The reinforcement member 40 is fixed to the vehicle body in the same manner as in the first embodiment. That is, the side brackets 43, 44 can be fixed to the vehicle body side portion 52 by screwing the bolts 54 into the nuts on the back portions of the mounting holes 45, 46 of the side brackets 43, 44 via the mounting holes 45, 46.

In the side bracket 43, the blower unit 31 is fixed to the reinforcement member 40 only at a portion where the mounting holes 48 are provided. This portion is connected to the other portions of the reinforcement member 40 only via the portion where the mounting holes 45 are provided. Therefore, in the second embodiment, the vibrations generated by blower unit 31 are transmitted to the steering unit via the following vibration transmittance route: the portion where the mounting holes 48 are provided on the side bracket 43→the portion fixed to the vehicle body (portion where the mounting holes 45 are provided) on the side bracket 43→the front face plate 40a, the bottom face plate 40b and the rear face plate 40c→the stay 42.

Therefore, the vibration transmittance is interrupted at the portion, where the mounting holes 45 are provided on the side bracket 43, firmly fixed to the vehicle body, thereby effectively reducing the vibrations to be transmitted to the steering unit. In the second embodiment, to increase stiffness of the side bracket 43, the side bracket 43 can be constructed thicker than the other portions of the reinforcement member 40. Or, the sectional shape of the side bracket 43 can be shaped to have a stiffer configuration thereof (such as a bent-plate shape).

In the first and second embodiments described above, the blower unit 31 is fixed only to the side bracket 43 of the reinforcement member 40. In a third embodiment, however, the bower unit 31 is fixed not only to the reinforcement member 40 but also to the vehicle body. FIG. 8 is an exploded perspective view showing components inside the vehicle dashboard 20 of the vehicle cockpit module 10, according to the third embodiment. A stud bolt 58 is fixed to the partition wall 55, partitioning the passenger compartment 57 on the vehicle rear side from the engine room 56 on the vehicle front side, on a portion adjacent to the left end portion thereof in the vehicle lateral direction. The stud bolt 58 is disposed so that the shank thereof protrudes to the side of the passenger compartment 57 (vehicle rear side).

In the blower unit 31, a fixing portion 31e is integrally or separately provided to protrude downward from the front and left side portion of the resin case of the blower 31b. The fixing portion 31e has a mounting hole 31f into which the shank of the stud bolt 58 can be fitted. According to the third embodiment, in the same manner as in the first embodiment, the vehicle rear side portion of the blower unit 31 is fixed to the subsidiary bracket 47 of the reinforcement member 40 by the screws 51. Further, the shank of the stud bolt 58 is fitted into the fixing portion 31e provided on the left side portion of the blower 31b.

A nut (not shown in the drawing) is tightened to the shank, thereby fixing the front and left side portion of the blower unit 31 to the partition wall 55 of the vehicle body.

In the third embodiment, further, the fixing portion (stud bolt 58) for fixing the blower unit 31 to the vehicle body is provided on the partition wall partitioning the passenger compartment 57 on the vehicle rear side from the engine room 56 on the vehicle front side. However, the fixing portion for fixing the blower unit 31 to the vehicle body may be provided on the vehicle body side portion 52 in place of the partition wall 55.

In the third embodiment, if the blower unit 31 is not stabaly mounted in the cockpit module 10 before the cockpit module 10 is installed in the vehicle, the following procedure can be performed.

Besides the subsidiary bracket 47 of the reinforcemnt member 40, a temporary fixing portion, for temporarily supporting the blower unit 31 and fixing it to the reinforcement member 40, is provided in the cockpit module 10 before the cockpit module 10 is installed in the vehicle. After the cockpit module 10 is installed in the vehicle, the temporary fixing portion is removed from the cockpit module 10, thereby supporting the blower unit 31 and fixing it to the reinforcement member 40 only by the subsidiary bracket 47 and the fixing portion 31e.

As a note, if the plate shape reinforcement member 40 is used as in the second embodiment, both a fixing portion fixed to the side bracket 43 and a fixing portion fixed to the vehicle body can be provided as a fixing portion of the blower unit 31.

Figure 9A:
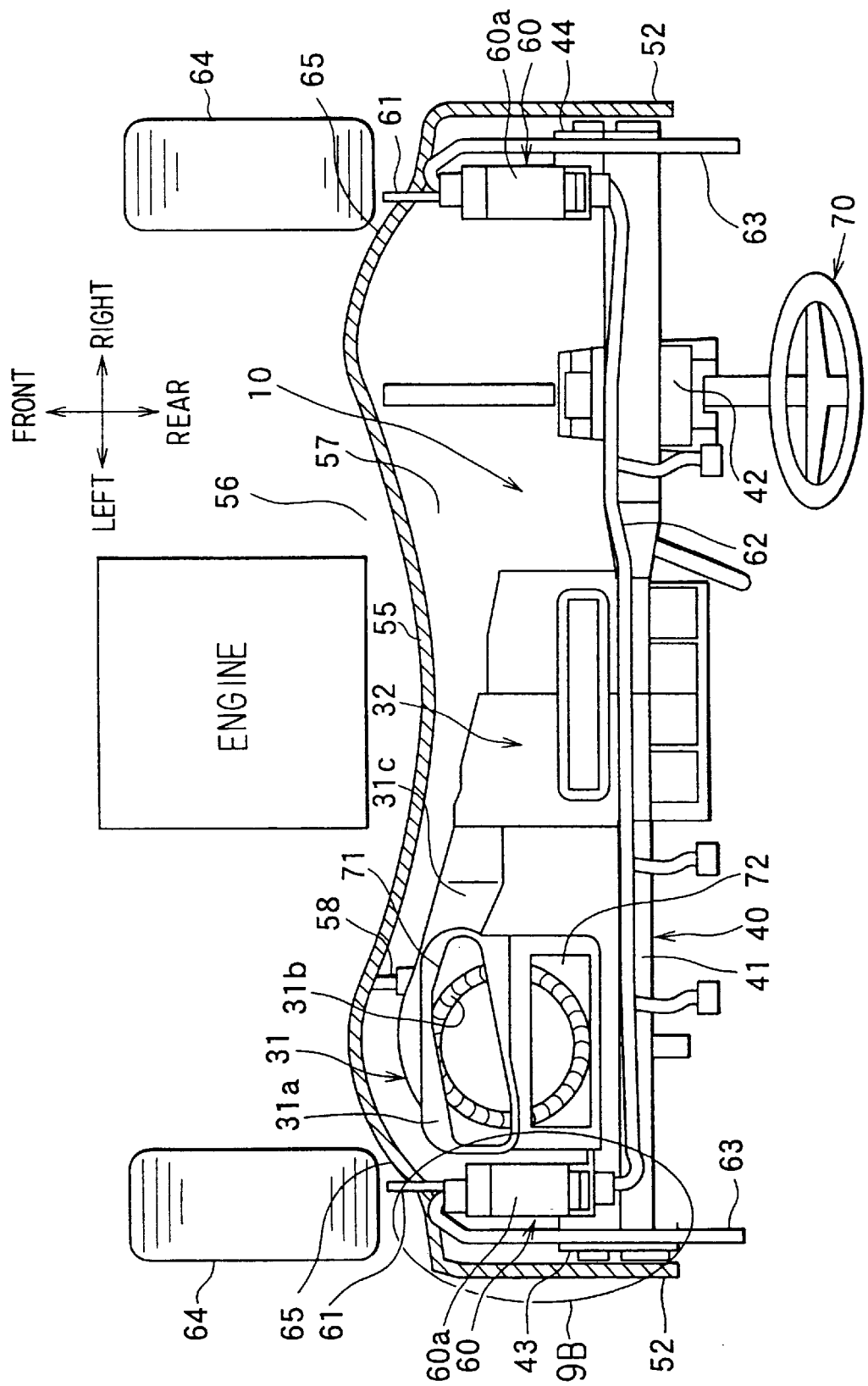
FIG. 9A is a partial sectional plan view showing a cockpit module and peripheral arrangement of a fourth embodiment of a vehicle cockpit module according to the present invention.
Figure 9B:
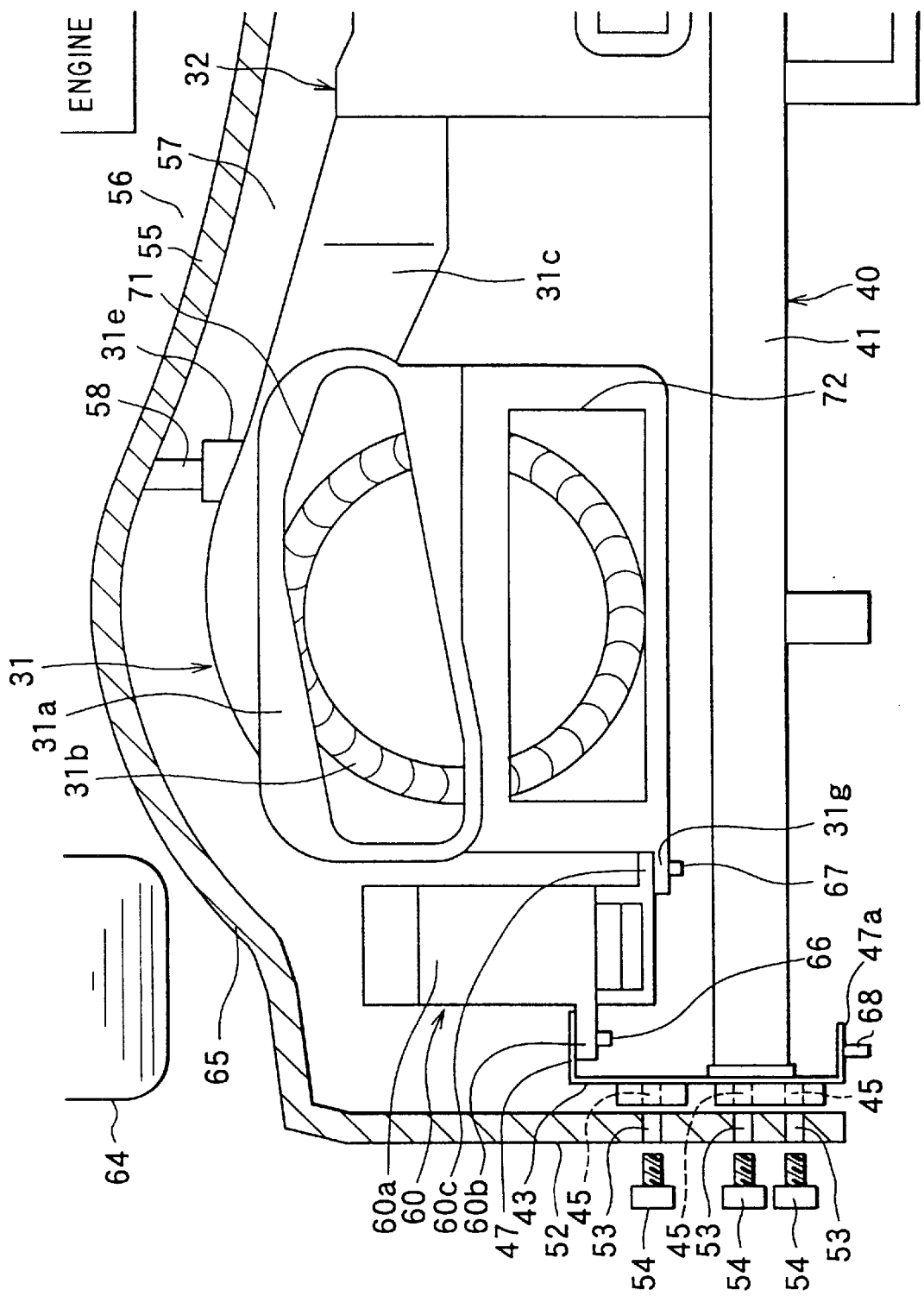
FIG. 9B is an enlarged detail view of a portion of a vehicle cockpit module in FIG. 9A according to the present invention.

Referring to FIG. 9A and 9B, a fourth embodiment of the present invention is shown and described. In the first to third embodiments described above, since the blower unit 31 is fixed to the side bracket 43 of the reinforcement member 40, it must be disposed around the end portion of the reinforcement member 40. However, sometimes a vehicle wheel well protrudes around the end portion of the reinforcement member 40, or an electric power distribution box (junction box) is disposed at this position. In this case, the blower unit 31 sometimes cannot be disposed around the end portion of the reinforcement member 40 because of the wheel well or electric power distribution box. The fourth embodiment addresses these problem.

In FIGS. 9A, 9B, the electric power distribution box 60 is a junction portion between vehicle electric wiring 61, 62, 63. The electric wiring 61 is wiring on the side of the engine room 56, the electric wiring 62 is wiring extending in a longitudinal direction with respect to the reinforcement member 40 inside the dashboard 20. The electric wiring 63 is wiring on the side of a door portion and a rear seat in the passenger compartment.

Figure 10:
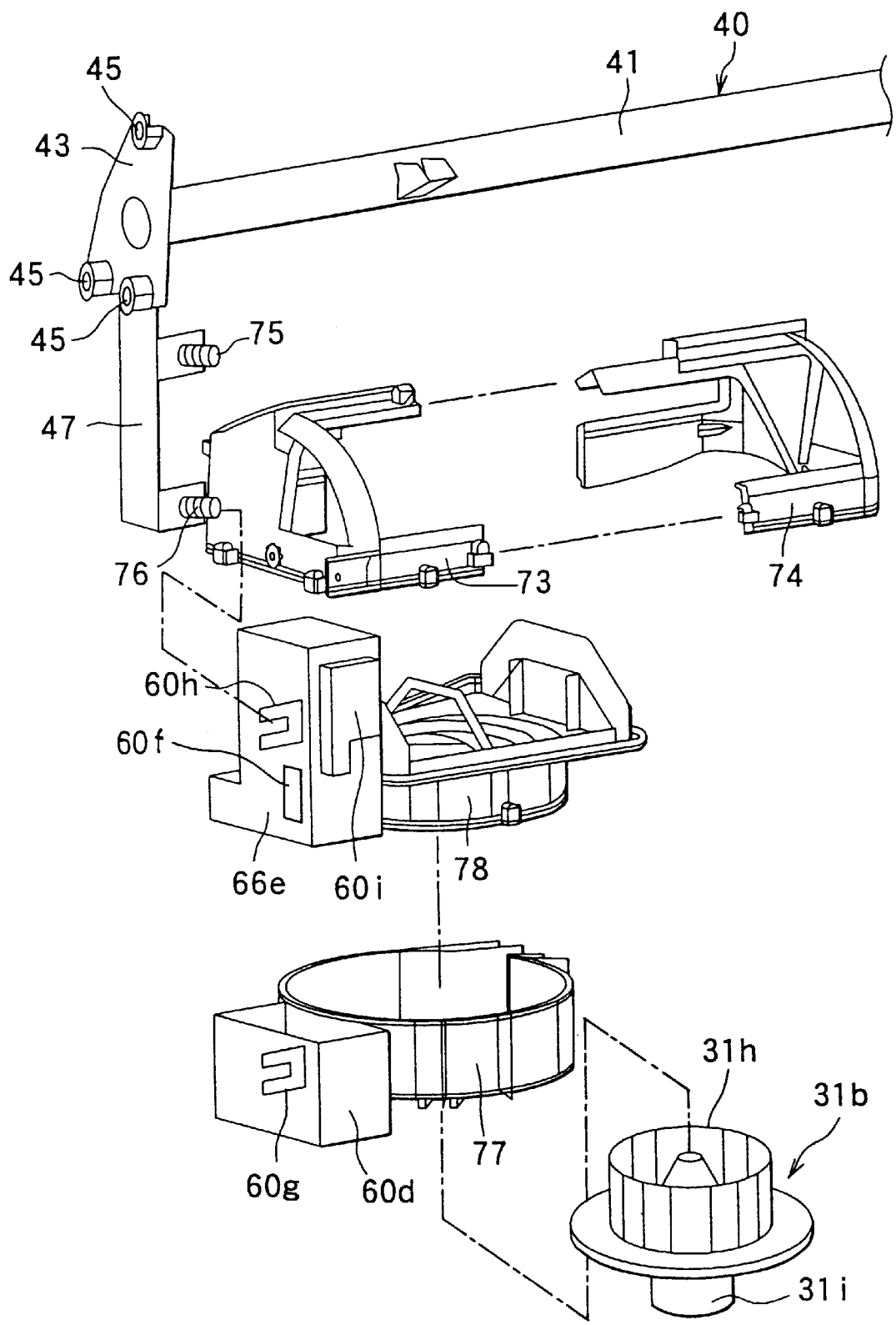
FIG. 10 is an exploded perspective view showing portions of a vehicle cockpit module according to the present invention.

The electric wiring 61 and the electric wiring 63 are disposed along the vehicle body side portion 52. Therefore, preferably, the electric power distribution boxes 60 are respectively disposed around each of the vehicle body side portions 52 on the right and left sides as shown in FIGS. 9, 10. On the other hand, in the vehicle to which the fourth embodiment is applied, front wheels 64 are disposed relatively adjacent to the partition wall 55. Therefore, the wheel wells 65 of the front wheels 64 protrude inside the passenger compartment 57.

However, since the size (volume) of the electric power distribution box 60 is much smaller than the blower unit 31, even if the wheel wells 65 protrude inside of the passenger compartment 57, the electric power distribution boxes 60 can be respectively disposed around the right and left end portions of the reinforcemnt member 40.

Further, case member 60a of the electric power distribution box is generally made of a stiff resin. In the fourth embodiment, the blower unit 31 is supported by the end portion of the reinforcement member 40 and fixed thereto by the electric power distribution box 60. Next, the support structure of the blower unit 31 according to the fourth embodiment will be specifically explained with reference to FIG. 9B. The electric power distribution box 60 on the vehicle left side is disposed between the wheel well 65 and the reinforcement member 40 in the vehicle longitudinal direction. Also, distribution box 60 is disposed between the blower unit 31 and the vehicle body side portion 52 on the left side in the vehicle lateral direction. The resin case member 60a of the electric power distribution box 60 has a rectangular parallelepiped shape, and contains a circuit substrate for electric connection. The resin case member 60a of the electric power distribution box 60 is strong enough to support the blower unit 31 by adding a reinforcement rib thereto or the like.

Further, first and second fixing portions 60b, 60c are integrally formed on the resin case member 60a of the electric power distribution box 60 by resin molding. The first fixing portion 60b protrudes toward the side of the side bracket 43 of the reinforcement member 40. The second fixing portion 60c protrudes toward the side of the blower unit 31. The main body portion of the side bracket 43 extends parallel to the vehicle body side portion 52 or in the vehicle longitudinal direction, and has a first subsidiary bracket 47 on the vehicle front side of the reinforcemnt member 40. The first subsidiary bracket 47 is bent toward the side of the electric power distribution box 60 and overlaps with the face of the first fixing portion 60b. The first subsidiary bracket 47 overlaps with the first fixing portion 60b of the electric power distribution box 60, and are fixed to each other by a bolt (fixing means) 66, so that the electric power distribution box 60 can be fixed to the side bracket 43. Further, a fixing portion 31g, protruding toward the side of the electric power distribution box 60, is integrally formed on a resin case of the blower 31b of the blower unit 31.

The fixing portion 31b overlaps with the second fixing portion 60c of the electric power distribution box 60, and are fixed to each other by a screw (fixing means) 67. As a result, the blower unit 31 is supported on the electric power distribution box 60 and affixed thereto. According to this manner, the blower unit 31 is supported indirectly by the side bracket 43 (reinforcement member 40) via the electric power distribution box 60. Further, the side bracket 43 has a second subsidiary bracket 47a at a position on the vehicle rear side. The second subsidiary bracket 47a is also bent in the same direction as the first subsidiary bracket 47 (inside direction in the vehicle lateral direction). Then, the second subsidiary bracket 47a overlaps with a fixing portion (not shown in the drawing) of the dashboard 20, and they are fixed to each other by a screw 68 (fixing means), so that the dashboard 20 can be fixed to the side bracket 43 of the reinforcemnt member 40. On the right end portion of the reinforcement member 40, the side bracket 44 is affixed to the dashboard 20 and the electric power distribution box 60 in the same structure as the side bracket 43 on the left end portion thereof.

Further, the side bracket 43 has multiple mounting holes 45 (three mounting holes in FIG. 9B) at an intermediate position between the first subsidiary bracket 47 and the second subsidiary bracket 47a. The side bracket 43 can be fixed to the vehicle body side portion 52 by screwing the bolts (fixing means) 54 into the mounting holes 45 via the mounting holes 53 of the vehicle body side portion 52. Similarly, the side bracket 44 on the right end side of the reinforcement member 40 can also be fixed to the vehicle body side portion 52 on the right side.

Here, at least one of the plural mounting holes 45 is necessarily disposed between the first subsidiary bracket 47 and the rod shape main body portion 41 of the reinforcement member 40. In FIG. 9B, the fixing portions are respectively disposed on the side bracket 43 in the following manner. The portion (portion where the mounting hole 45 are provided) to be fixed to the vehicle body is disposed between the fixing portion 47, 60b of the electric power distribution box 60 and the rod shape main body portion 41 of the reinforcement member 40. Further, the portion (portion where the mounting holes 45 are provided) to be fixed to the vehicle body is disposed between the rod shape main body portion 41 of the reinforcement member 40 and the fixing portion 47a of the dashboard 20 as well.

In the fourth embodiment, the blower unit 31 is fixed to the side bracket 43 in the same manner as in the third embodiment. Further, a shank of stud bolt 58 is fit into the fixing portion 31e of the blower 31b. The fit portion is tightened, so that the blower unit 31 can be fixed to the partition wall 55 on the side of the vehicle body as well.

In FIG. 9A, a steering unit 70 is supported by the support stay 42 of the rod shape main body portion 41 of the reinforcemnt member 40. Further, an inside/outside air switching box 31a of the blower 31b has an outside air inlet 71 and an inside air inlet 72.

Next, an operation according to the fourth embodiment will be explained. The vibrations from the blower 31b are transmitted to the side bracket 43 via the electric power distribution box 60. However, on the side bracket 43, the portion (portion where the mounting holes 45 are provided) fixed to the body is disposed between the fixing portions 47, 60b of the electric power distribution box 60 and the rod shape main body portion 41 of the reinforcement member 40. Therefore, blower vibration transmittance is interrupted at the portion (portion where the mounting holes 45 are provided) fixed to the vehicle body from the side bracket 43 to the rod shape main body portion 41.

Therefore, even when the blower unit 31 is fixed to the side bracket 43 of the reinforcement member 40 via the electric power distribution box 60, the blower vibrations are not transmitted to the steering unit 70 via the reinforcement member 40.

Further, the blower vibrations are also transmitted to the partition wall 55 on the vehicle body side via the portion where the fixing portion 31e of the blower 31b and stud bolt 58 are fixed to each other. However, since the partition wall 58 has very large stiffness, the blower vibrations are damped in the partition wall 55 and absorbed thereinto. Therefore, the blower vibrations cannot be transmitted to the steering unit 70 via the partition wall 55.

Further, since the portion (portion where the mounting holes 45 are provided) fixed to the body is disposed between the fixing portion 47a of the dashboard 20 and the fixing portions 47, 60b as well, the blower vibrations cannot be transmitted to the dashboard 20. Even where the wheel wells 65 of the front wheels 64 protrude into the passenger compartment 57, the vibration transmission is interrupted from the blower 31b to the steering unit, while the cockpit modulization of the blower unit 31 can be attained by effectively using the electric power distribution box 60 to fix the blower unit 31 to the side bracket 43 of the reinforcement member 40.

In the third and fourth embodiments, the stud bolt 58 is changed to a pin-shaped member, so that the pin-shaped member is fit to the mounting hole 31f of the fixing portion 31e of the blower 31b or an engaging bore portion and can be engaged therewith.

Referring to FIG. 10, a fifth embodiment of the present invention is described. In the fourth embodiment, the blower unit 31 and the electric power distribution box 60 are formed separately from each other. However, in a fifth embodiment, a case member of the electric power distribution box 60 is integrated with a case member of the blower unit 31. In the present example, the case member of the blower unit 31 is formed by resin molding as four portions separated from each other: a blower lower side case 77, a blower upper side case 78, an inside/outside air switching-box left side case 73 and an inside/outside air switching-box right side case 74.

Further, a lower side case 60d of the electric power distribution box 60 is integrated with the side portion of the blower lower side case 77. An upper side case 60e of the electric power distribution box 60 is integrated with the side portion of the blower upper side case 78. When the blower lower side case 77 is connected to the blower upper side case 78 to form a case, the lower side case 60d of the electric power distribution box 60 can be connected to the upper side case 60e thereof to form another case in accordance with this work. The electric power distribution box 60 contains circuit substrate 60f.

Further, fixing portions 60g, 60h are respectively integrated with the lower side case 60d and the upper side case of the electric power distribution box 60. In the example shown in FIG. 10, the fixing portions 60g, 60h are respectively U-shaped so that the below-described stud bolts 75, 76 can be inserted thereinto. The upper side case 60e of the electric power distribution box 60 has a connection portion 60i for connecting with wiring 62 inside the dashboard.

A centrifugal type blower fan 31h is disposed inside the case formed by the blower lower side case 77 and the blower upper side case 78, and a driving motor 31i of the blower 31b protrudes outside the lower side case 77. On the other hand, the mounting holes (female screw portions) 45 are provided as fixing portions on the side bracket 43 on both the upper and lower sides of the reinforcement member 40. on the side bracket 43, further, the subsidiary bracket 47 integrally extends further downward from the lower side of the mounting holes 45. On each of bent pieces on the upper and lower sides of the subsidiary bracket 47, stud bolts (fixing means) 75, 76, extending in the vehicle longitudinal direction, are respectively provided.

According to the fifth embodiment, at first, the separated cases 73, 74, 77, 78 of the blower unit 31 and the separated cases 60d, 60e of the electric power distribution box 60 are integrally fastened. Thereafter, the stud bolts 75, 76 are respectively inserted-into each of the U-shaped fixing portions 60g, 60h, respectively integrated with each of the cases 60d, 60e of the electric power distribution box 60. Thus, the blower unit 31 can be fixed to the side bracket 43 of the reinforcement member 40 by tightening nuts (not shown in the drawing) to the stud bolts 75, 76.

In this case, the portion to be fixed to the vehicle body by the mounting holes 45 is also disposed between the subsidiary bracket 47 for fixing the blower unit thereto and the rod shape main body portion 41 of the reinforcement member 40. Therefore, the blower vibrations cannot be transmitted to the steering unit 70 via the reinforcement member 40.

While the above-described embodiments refer to examples of usage of the present invention, it is understood that the present invention may be applied to other usage, modifications and variations of the same, and is not limited to the disclosure provided herein.

What is claimed is:

1. In a vehicle having a dashboard that contains at least an air conditioner and a reinforcement member, the reinforcement member including a support portion for supporting a steering unit, a cockpit module for the vehicle comprising:

at least a portion of a blower unit of the air conditioner fixed to a fixing portion for fixing the reinforcement member to a vehicle body, the blower unit being integrally mounted inside the dashboard via the reinforcement member.

2. In a vehicle having a dashboard that contains at least an air conditioner and a reinforcement member, the reinforcement member including a support portion for supporting a steering unit, a cockpit module for the vehicle comprising:

at least a portion of a blower unit of the air conditioner is fixed to the reinforcement member;

a first fixing portion disposed within a vibration transmittance mute in the reinforcement member between a second portion and the support portion, the first portion fixes the reinforcement member to a vehicle body, the second portion is fixed to the blower unit; and the blower unit is integrally mounted inside the dashboard via the reinforcement member.

3. The vehicle according to claim 1, wherein;

the reinforcement member extends inside the dashboard in a vehicle lateral direction; and fixing portions are respectively disposed at each end of the reinforcement member in the vehicle lateral direction, each of the fixing portions is fixed to the vehicle body.

4. In a vehicle having a dashboard, the dashboard containing at least an air conditioner and a reinforcement member, said reinforcement member including a support portion for supporting a steering unit, a cockpit module for the vehicle comprising;

the reinforcement member is disposed inside the dashboard and extends in a vehicle lateral direction;

fixing portions respectively disposed at each end of the reinforcement member in the vehicle lateral direction, each of the fixing portions is fixed to a vehicle body, wherein the support portion is disposed around one end of the reinforcement member in the vehicle lateral direction;

at least a portion of the blower unit is fixed to an opposite end of the reinforcement member with respect to said one end in the vehicle lateral direstion:

the air conditioner unit is fixed to the reinforcement member between the support portion and the blower unit, the air conditioner unit adjusts the temperature of air blown from the blower unit and blows the adjusted air into a passenger compartment; and the blower unit and the air conditioner unit are integrally mounted inside the dashboard via the reinforcement member.

5. The vehicle according to claim 4, wherein:

the reinforcement member includes a bracket for fixing the reinforcement member to the vehicle body, the bracket is provided separately from the reinforcement member; and the fixing portion is disposed on the bracket, the fixing portion is fixed to the blower unit.

6. The vehicle according to claim 4, wherein:

the reinforcement member is shaped as a rod extending in the vehicle lateral direction.

7. The vehicle according to claim 2, wherein:

the reinforcement member is shaped as a plate and extends in the vehicle lateral direction; and a bracket including fixing portions is integrated with the reinforcement member, the fixing portion fixes the reinforcement member to the vehicle body, the fixing portion being fixed to the blower unit.

8. The vehicle according to claim 1, wherein:

the blower unit includes a blower fixing portion fixed to at least one of a partition wall and a vehicle body side portion, the partition wall is provided between a passenger compartment and an engine room.

* * * * *

UNITED STATES PATENT AND TRADEMARK OFFICE
CERTIFICATE OF CORRECTION

PATENT NO. : 6,296,303 B1
DATED : October 2, 2001
INVENTOR(S) : Tomohiro Kamiya et al.

Page 1 of 1

It is certified that error appears in the above-identified patent and that said Letters Patent is hereby corrected as shown below:

<u>Title page,</u>
Item [30] Foreign Application Priority Data, "(JP) 12-201494" should be -- (JP) 2000-201494 --

Signed and Sealed this

Twenty-eighth Day of May, 2002

Attest:

JAMES E. ROGAN
*Director of the United States Patent and Trademark Office*

*Attesting Officer*